United States Patent
Alford et al.

(10) Patent No.: US 11,820,342 B2
(45) Date of Patent: Nov. 21, 2023

(54) HYDRAULIC MOTOR VEHICLE BRAKING SYSTEM AND METHOD FOR OPERATING SAME

(71) Applicant: ZF Active Safety GmbH, Koblenz (DE)

(72) Inventors: Nicholas Alford, Waldesch (DE); Andreas Marx, Hartenfels (DE)

(73) Assignee: ZF Active Safety GmbH, Koblenz (DE)

( * ) Notice: Subject to any disclaimer, the term of this patent is extended or adjusted under 35 U.S.C. 154(b) by 485 days.

(21) Appl. No.: 17/046,879

(22) PCT Filed: Apr. 11, 2019

(86) PCT No.: PCT/EP2019/059303
§ 371 (c)(1),
(2) Date: Oct. 12, 2020

(87) PCT Pub. No.: WO2019/197550
PCT Pub. Date: Oct. 17, 2019

(65) Prior Publication Data
US 2021/0031741 A1    Feb. 4, 2021

(30) Foreign Application Priority Data

Apr. 12, 2018  (DE) ..................... 10 2018 003 001.7

(51) Int. Cl.
*B60T 13/66*       (2006.01)
*B60T 7/04*        (2006.01)
(Continued)

(52) U.S. Cl.
CPC ............ *B60T 13/662* (2013.01); *B60T 7/042* (2013.01); *B60T 11/165* (2013.01); *B60T 13/58* (2013.01);
(Continued)

(58) Field of Classification Search
CPC ............ B60T 13/745; B60T 2270/402; B60T 2270/404; B60T 2270/82
See application file for complete search history.

(56) References Cited

U.S. PATENT DOCUMENTS 10,611,348 B2 * 4/2020 Zipfel ..................... B60T 7/12
11,325,574 B2 * 5/2022 Baehrle-Miller ......... B60T 8/17
(Continued)

FOREIGN PATENT DOCUMENTS

DE    102011108297 A1    8/2012
DE    102014221901 A1    4/2016
WO      2012150120 A1   11/2012

*Primary Examiner* — Bradley T King
(74) *Attorney, Agent, or Firm* — Robert James Harwood

(57) ABSTRACT

A hydraulic motor vehicle braking system includes a first sensor device, a first functional unit, a second functional unit and a switching device. The first functional unit comprises at least one first electrical brake pressure generator, by means of which a brake pressure can be generated on respective wheel brakes, and a first control system which is designed to control the at least one first electrical brake pressure generator on the basis of a sensor signal of the sensor device. The second functional unit comprises at least one second electrical brake pressure generator, by means of which a brake pressure can be respectively generated on a subset of the wheel brakes, and a second control system which is designed to control the at least one second electrical brake pressure generator on the basis of the sensor signal in the event of a failure of the first functional unit.

14 Claims, 3 Drawing Sheets

(51) Int. Cl.
  *B60T 11/16*  (2006.01)
  *B60T 13/58*  (2006.01)
  *B60T 13/74*  (2006.01)
  B60T 8/40  (2006.01)
  B60T 13/16  (2006.01)

(52) U.S. Cl.
  CPC .......... *B60T 13/745* (2013.01); *B60T 8/4081* (2013.01); *B60T 13/161* (2013.01); *B60T 2220/04* (2013.01); *B60T 2240/00* (2013.01); *B60T 2270/402* (2013.01); *B60T 2270/404* (2013.01); *B60T 2270/82* (2013.01)

(56) References Cited

U.S. PATENT DOCUMENTS

| | | | |
|---|---|---|---|
| 11,680,976 B2* | 6/2023 | Schwab | B60T 17/22 |
| | | | 324/503 |
| 2013/0282249 A1* | 10/2013 | Heise | B60T 13/746 |
| | | | 701/70 |
| 2016/0114779 A1* | 4/2016 | Binder | B60T 8/171 |
| | | | 701/76 |
| 2018/0290642 A1* | 10/2018 | Tschiene | B60T 8/885 |
| 2020/0070797 A1* | 3/2020 | Plewnia | B60T 15/041 |
| 2021/0031741 A1* | 2/2021 | Alford | B60T 13/662 |
| 2022/0410861 A1* | 12/2022 | Ahn | B60T 13/745 |
| 2023/0030062 A1* | 2/2023 | Grieser-Schmitz | B60T 8/92 |
| 2023/0033528 A1* | 2/2023 | Yang | B60T 11/22 |
| 2023/0202435 A1* | 6/2023 | Schmidt | B60T 7/12 |
| | | | 701/70 |
| 2023/0202441 A1* | 6/2023 | Xie | B60T 8/171 |
| | | | 303/20 |

\* cited by examiner ved between a coupling of the first sensor device to the first control system and a coupling of the first sensor device to the second control system. The switch-over can take place as a function of a switching signal. The switching signal can be generated by the first functional unit and/or the second functional unit and/or another component of the brake system. The switching signal can be generated depending on a functionality of the first functional unit which is detected by the first functional unit and/or the second functional unit.

HYDRAULIC MOTOR VEHICLE BRAKING SYSTEM AND METHOD FOR OPERATING SAME

CROSS-REFERENCE TO RELATED APPLICATION

This application is a national stage of International Application No. PCT/EP2019/059303, filed Apr. 11, 2019, the disclosure of which is incorporated herein by reference in its entirety, and which claimed priority to German Patent Application No. 102018003001.7, filed Apr. 12, 2018, the disclosure of which is incorporated herein by reference in its entirety.

TECHNICAL FIELD

The present disclosure relates in general to the field of motor vehicle brake systems. Specifically, a hydraulic motor vehicle brake system and a method for its operation are described.

BACKGROUND

Conventional hydraulic motor vehicle brake systems using the brake-by-wire (BBW) principle comprise an electrical brake pressure generator which generates the brake pressure at the wheel brakes in normal braking mode. To achieve this, deceleration of the vehicle which is requested by the driver at a brake pedal is detected by a sensor and converted into an activation signal for the electrical brake pressure generator.

In order to still be able to build up a brake pressure at the wheel brakes even in the event of the failure of the electrical brake pressure generator, hydraulic brake systems using the BBW principle generally additionally comprise a master cylinder by means of which hydraulic fluid can also be conveyed to the wheel brakes. In normal braking mode, the brake pedal is decoupled from the master cylinder or the master cylinder is decoupled from the wheel brakes. In this case, a brake pressure is built up solely by means of the electrical brake pressure generator. In contrast, during emergency braking mode, i.e. for example in the event of failure of the electrical brake pressure generator, the decoupling is overridden. In this case, a brake pressure is generated at the wheel brakes by the driver themselves by means of the brake pedal acting on the master cylinder.

Because the decoupling of the brake pedal and the master cylinder, or the master cylinder and the wheel brakes, is overridden, the emergency braking mode is also referred to as push-through (PT) mode. The opportunity afforded to the driver of being able to build up a brake pressure at the wheel brakes via the master cylinder in PT mode creates a redundancy which for safety considerations is inevitable in many cases.

Motor vehicle brake systems for autonomous or semi-autonomous driving likewise need to be designed redundantly. However, in such cases it cannot be assumed that the driver is also situated in the vehicle (for example, in remote-controlled parking (RCP) mode) or that the driver can immediately activate a brake pedal for PT mode (for example, when his/her gaze is averted from the road in front). In other words, the driver is not present as a redundant part of the brake pressure generation.

For this reason, in addition to a functional unit which supplies an electrically actuatable main braking function, it is a requirement that a brake system also comprises a further functional unit which implements an electrically actuatable auxiliary braking function redundantly. The brake pedal and the master brake cylinder situated downstream therefrom can then be retained or be omitted depending on safety requirements.

SUMMARY

The present disclosure is based on the object of providing a hydraulic motor vehicle brake system which redundantly comprises two electrical brake pressure generators and meets high safety requirements.

According to one aspect, a hydraulic motor vehicle brake system is provided which comprises a first sensor device, a first functional unit, a second functional unit, and a first switching device. The first sensor device is designed to generate a sensor signal. The second functional unit comprises at least one first electrical brake pressure generator by means of which a brake pressure can be generated in each case at wheel brakes, and a first control system which is designed to actuate the at least one first electrical brake pressure generator based on the sensor signal. The second functional unit comprises at least one second electrical brake pressure generator by means of which in each case a brake pressure can be generated at a subset of the wheel brakes, and a second control system which is designed to actuate a second electrical brake pressure generator based on the sensor signal in the event of a malfunction of the first functional unit. The first switching device is designed to selectively couple the first sensor device to the first control system or the second control system depending on a functionality of the first functional unit.

The first switching device can be designed to couple the first sensor device to the second control system in the event of a malfunction of the first functional unit. The first switching device can be designed to couple the first sensor device to the first control system when there is no or no relevant malfunction of the first functional unit. The first switching device can consequently be designed as a switch-over device in order to switch over between a coupling of the first sensor device to the first control system and a coupling of the first sensor device to the second control system. The switch-over can take place as a function of a switching signal. The switching signal can be generated by the first functional unit and/or the second functional unit and/or another component of the brake system. The switching signal can be generated depending on a functionality of the first functional unit which is detected by the first functional unit and/or the second functional unit.

The malfunction of the first functional unit can be a total failure or a partial failure of the first functional unit. Thus, the first electrical brake pressure generator or the first control system or another component of the first functional unit can, for example, fail. It is also conceivable that both the first electrical brake pressure generator and the first control system fail at the same time. The malfunction of the first functional unit can be detected by the first functional unit itself and signaled to the second functional unit. Additionally or alternatively, the second functional unit can also be designed to detect a malfunction of the first functional unit.

The second functional unit can be designed to perform redundantly many or all of the brake pressure regulating functions that the first functional unit is capable of performing. Exemplary vehicle-stabilizing brake pressure regulating functions which can be performed by the first and/or second functional unit comprise one or more of the following functions: antilock braking system, traction control system, vehicle dynamic control system, and automatic distance control. The second functional unit can moreover be designed to actuate the second electrical brake pressure generator in the event of a malfunction of the first functional unit, as part of normal braking which is controlled in particular by brake pressure, also termed service braking.

The wheel brakes can comprise front wheel brakes and rear wheel brakes. The subset of the wheel brakes at which the second electrical brake pressure generator is capable of generating a brake pressure in each case can be a proper subset or an improper subset of the wheel brakes at which the first electrical brake pressure generator is capable of generating a brake pressure in each case. In the case of an improper subset, the second electrical brake pressure generator is capable of generating a brake pressure at all the wheel brakes in each case. In an exemplary proper subset, the subset of the wheel brakes comprises just the front wheel brakes of the motor vehicle. In this example, the wheel brakes of the rear wheels are thus not included in the subset of the wheel brakes.

The first functional unit can comprise a brake cylinder which can be coupled to a brake pedal. The first functional unit can furthermore be provided with a hydraulic switch-over device in order to couple selectively the first brake pressure generator or the master cylinder to at least one of the wheel brakes.

The two functional units can be separated from each other logically and/or physically. At least some of the components of functional units which are physically separated from one another can be accommodated in different housings or housing parts. The different housings or housing parts can be fastened to one another directly, i.e. with at least approximately no gap, and hence be considered as two part housings of a superordinate overall housing.

The first control system and the second control system can be implemented by means of a redundant microprocessor. In particular, the first control system and the second control system can be implemented in separate control units with a respective associated microprocessor.

According to an alternative embodiment, the wheel brakes at which the first electrical brake pressure generator is capable of generating a brake pressure comprise the front wheel brakes and the rear wheel brakes. According to this alternative embodiment, the subset of the wheel brakes at which the second electrical brake pressure generator is capable of generating a brake pressure can comprise just the front wheel brakes (and not the rear wheel brakes). Additionally or alternatively, at least two electrical parking brake actuators are present which are capable of generating a braking force at front wheels or just at rear wheels, respectively.

The first functional unit can comprise a first electronic module into which the first control system and the first switching device are integrated. The first electronic module can be formed by a control unit and in particular a circuit board of the control unit.

The brake system can moreover comprise a second switching device which is designed to couple the first switching device to the second control system depending on a functionality of the first functional unit. The second switching device can in particular be designed to decouple the first switching device from the second control system in the case of a given functionality of the first functional unit. The second functional unit can comprise a second electronic module into which the second control system and the second switching device are integrated. The second control system and the second switching device can be integrated into a control unit of the second functional unit, in particular a circuit board of the control unit.

Similarly to the first switching device, the second switching device can also be a switch-over device. The second switch-over device can be activatable by the first functional unit or the second functional unit or another component of the brake system.

The first switching device and/or a third switching device can be designed to couple the first sensor device selectively to a first power supply or a second power supply. The third switching device can here be integrated into the second electronic module. The third switching device can be identical to the second switching device.

A hard-wired cable can be provided which couples the first switching device to the second functional unit. The hard-wired cable can in particular couple the first switching device to the second switching device which is designed as part of the second functional unit.

The sensor device can be designed to detect a parameter associated with an activation of a brake pedal. The first sensor device can thus in particular comprise a brake pedal travel sensor. Alternatively, the first sensor device can comprise at least one wheel sensor.

The first control system can be designed to actuate the first electrical brake pressure generator based on the sensor signal in order to boost a hydraulic pressure generated by a driver in a master cylinder by means of a brake pedal. Additionally or alternatively, the second control system can be designed to actuate the second electrical brake pressure generator based on the sensor signal in order to boost a hydraulic pressure generated by a driver in a master cylinder by means of a brake pedal.

The first control system can be designed to actuate the first electrical brake pressure generator, based on the sensor signal, for a vehicle-stabilizing brake pressure regulation. Additionally or alternatively, the second control system can be designed to actuate the second electrical brake pressure generator, based on the sensor signal, for a vehicle-stabilizing brake pressure regulation.

In general, the brake system can be designed to use a sensor signal of a second sensor device for actuating the first electrical brake pressure generator or the second electrical brake pressure generator instead of the sensor signal of the first sensor device in the event of a malfunction of the first switching device.

According to a further aspect, a method for operating a hydraulic motor vehicle brake system is provided. The brake system comprises a sensor device which is designed to generate a sensor signal, and a first functional unit and a second functional unit. The first functional unit comprises at least one first electrical brake pressure generator by means of which a brake pressure can be generated in each case at wheel brakes, and a first control system which is designed to actuate the at least one first electrical brake pressure generator based on the sensor signal. The second functional unit comprises at least one second electrical brake pressure generator by means of which a brake pressure can be generated in each case at a subset of the wheel brakes, and a second control system which is designed to actuate the at least one second electrical brake pressure generator based on the sensor signal in the event of a malfunction of the first functional unit. The method comprises the step of selectively coupling the sensor device to the first control system or the second control system depending on a functionality of the first functional unit.

The method can comprise one or more further steps, as described above and below.

A computer program product is moreover provided which comprises program code for performing the method presented here when the program code is executed on a motor vehicle control unit.

Also provided is a motor vehicle control unit or control unit system (consisting of multiple control units), wherein the control unit or control unit system has at least one processor and at least one memory and wherein the memory comprises program code which, when executed by the processor, ensures that the steps of the method provided here are performed.

BRIEF DESCRIPTION OF THE DRAWINGS

Further aspects, details, and advantages of the present disclosure arise from the following description of exemplary embodiments with reference to the drawings, in which.

DETAILED DESCRIPTION

Figure 1:
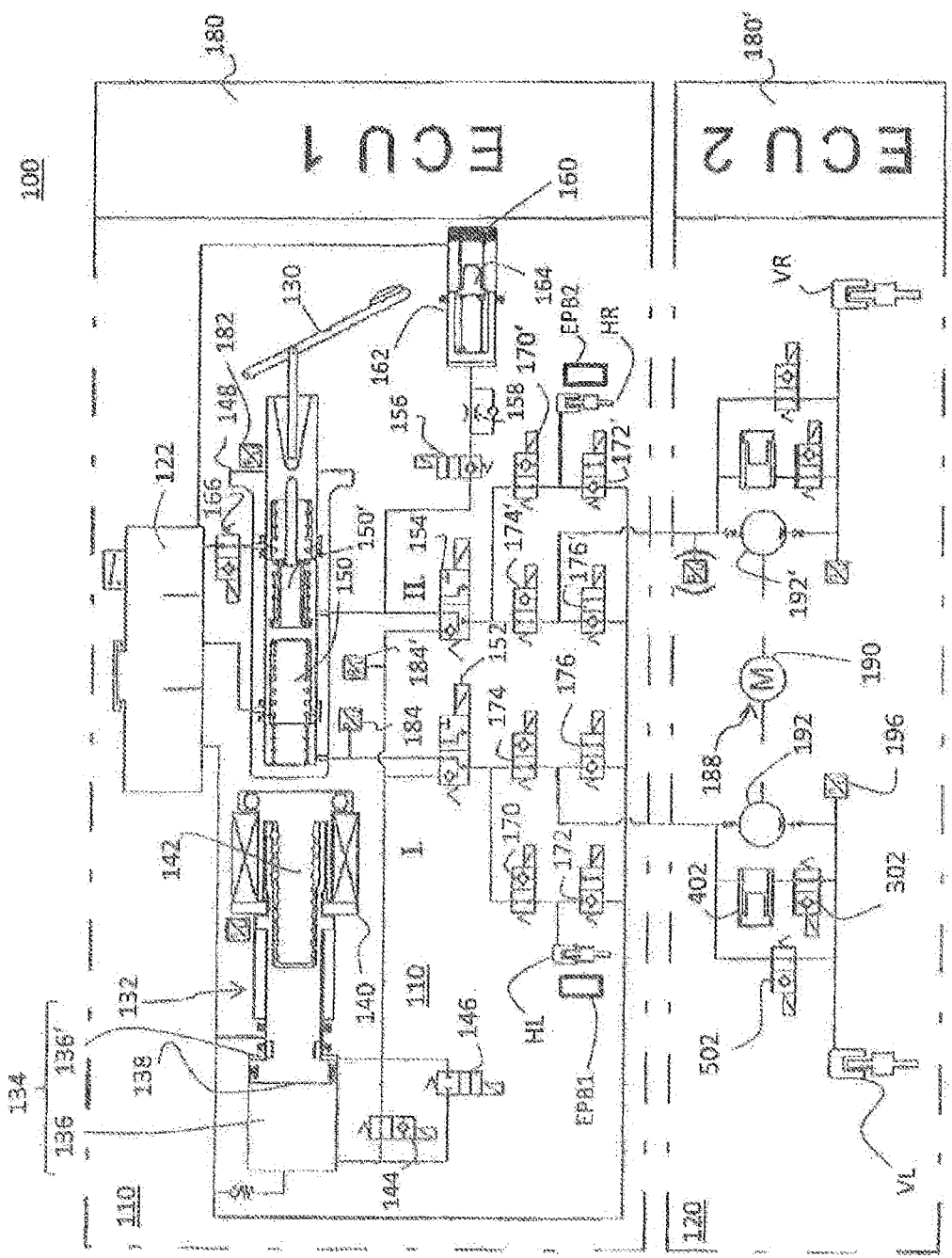
FIG. 1 shows an exemplary embodiment of a hydraulic motor vehicle brake system.

The hydraulic circuit diagram of a first exemplary embodiment of a hydraulic motor vehicle brake system 100 using the BBW principle is shown in FIG. 1.

The brake system 100 is designed to be suited also for autonomous or semi-autonomous driving.

As shown in FIG. 1, the brake system 1 comprises a first functional unit 110 which provides an electrically actuatable master braking function and a second functional unit 120 which redundantly implements an electrically actuatable auxiliary braking function. Whereas the first functional unit 110 is designed to build up a brake pressure at two front wheel brakes VL, VR and two rear wheel brakes HL, HR of a two-axle motor vehicle, the second functional unit 120 is designed to build up a brake pressure only at the two wheel brakes VL, VR of the front wheels. In alternative exemplary embodiments, the second functional unit 120 could be designed to build up a brake pressure only at the two wheel brakes HL, HR of the rear wheels, at all four wheel brakes VL, VR, HL, HR, or at two diagonally opposite wheel brakes VL/HR or VR/HL.

The first functional unit 110 is designed to perform wheel brake pressure regulation, decoupled from a driver's braking intention, at one or more of the wheel brakes VL, VR, HL, HR. The second functional unit 120 can perform at least some wheel brake pressure regulating functions of the first functional unit 110 redundantly at the wheel brakes VL and VR.

The two functional units 110, 120 can be housed in separate housing blocks as separate modules. The first functional unit 110 can thus as required be constructed either alone or in combination with the second functional unit 120.

As can also be inferred from FIG. 1, the brake system 100 comprises two electrical parking brake actuators EPB1, EBP2. In the exemplary embodiment, a first parking brake actuator EPB1 is associated with the left rear wheel and a second parking brake actuator EPB2 is associated with the right rear wheel. In other exemplary embodiments, the parking brake actuators EPB1, EBP2 are associated with the front wheels. A parking brake actuator can also be provided in each case at all four wheels. The parking brake actuators EPB1, EPB2 can be integrated in a structural unit with the wheel brakes HL, HR.

Each of the parking brake actuators EPB1, EBP2 comprises an electromotor and a transmission situated downstream from the electromotor. The transmission converts a rotational movement of the electromotor into a translational movement of a brake piston of one of the wheel brakes HL, HR. In this way, the brake piston can be brought to bear against an associated brake disk in order to generate a braking force.

With reference to FIG. 1, the brake system 100 works by means of a hydraulic fluid which is partially stored in an unpressurized reservoir 122. Brake pressures at the wheel brakes VL, VR, HL, HR can be generated by means of the first functional unit 110 and the second functional unit 120 independently of one another by the hydraulic fluid being pressurized.

The first functional unit 110 comprises a first electrical brake pressure generator 132 for the purpose of generating brake pressure in BBW mode autonomously, semi-autonomously, or when requested by the driver at a brake pedal 130. In the exemplary embodiment, this brake pressure generator 132 comprises a double-acting cylinder/piston arrangement 134 using the plunger principle with two cylinder chambers 136, 136' and a piston 138 which can move therein. The piston 138 of the brake pressure generator 132 is driven by an electromotor 140 via a transmission 142. In the exemplary embodiment, the transmission 142 is designed to convert a rotational movement of the electromotor 140 into a translational movement of the piston 138. In another exemplary embodiment, the brake pressure generator 132 could also be designed as a single-acting cylinder/piston arrangement with only one cylinder chamber.

The two cylinder chambers 136, 136' can be coupled both to the reservoir 122 and to two brake circuits I. and II., wherein each brake circuit I. and II. in turn supplies two wheel brakes VL, HL or VR, HR, respectively. A different assignment of the four wheel brakes VL, VR, HL, HR to the two brake circuits I. and II. is also possible (for example, a diagonal distribution).

In the present exemplary embodiment, two valves 144, 146 which are connected in parallel and activated by electromagnets are associated with the electrical brake pressure generator 132. In accordance with the double action principle, the valve 144 serves to fluidically couple in each case one of the chambers 136, 136' to the two brake circuits I. and II., whilst the other of the chambers 136, 136' aspirates hydraulic fluid from the reservoir 122. The optional valve 146 can be actuated in conjunction with ventilation of the hydraulic system or other operations. In the unactivated, i.e. electrically unactuated state, the valves 144, 146 assume the basic positions shown in FIG. 1. This means that the valve 144 assumes its throughflow position and the valve 146 its blocking position such that, when the piston 138 performs a forward stroke (to the left in FIG. 1), hydraulic fluid is forced out of the front chamber 136 into the two brake circuits I. and II. In order to force hydraulic fluid out of the rear chamber 136' into the two brake circuits I. and II. when the piston 138 performs a backward stroke (to the right in FIG. 1), all that is required is for the valve 144 to be actuated, i.e. transferred into its blocking position.

In order to generate brake pressure in PT mode, the first functional unit 110 moreover comprises a master cylinder 148 which is to be activated by the driver by means of the pedal 130. The master cylinder 148 in turn comprises two chambers 150, 150', wherein the first chamber 150 is coupled to the first brake circuit I. and the second chamber 150' to the second brake circuit II.

The two brake circuits I. and II. can be supplied with pressurized hydraulic fluid by means of the master cylinder 148 (redundantly to the electrical brake pressure generator 132). Two valves 152, 154 which are activated by electromagnets are provided for this purpose which assume the basic positions shown in FIG. 1 in the unactivated, i.e. electrically unactuated state. In these basic positions, the valves 152, 154 couple the master cylinder 148 to the wheel brakes VL, VR, HL, HR. Thus, even in the event of the failure of the energy supply (and an accompanying failure of the electrical brake pressure generator 132), it is still possible for hydraulic pressure to be built up at the wheel brakes VL, VR, HL, HR by the driver by means of the brake pedal 130 acting on the master cylinder 148 (PT mode).

In contrast, in BBW mode, the valves 152, 154 are switched such that the master cylinder 148 is fluidically decoupled from the two brake circuits I. and II., whilst the electrical brake pressure generator 132 is coupled to the brake circuits I. and II. When the master cylinder 148 is decoupled from the brake circuits I. and II., the hydraulic fluid forced out of the master cylinder 148 is thus not conveyed into the brake circuits I. and II. when the brake pedal 130 is activated and instead into a simulator 160 via a 2/2-way valve 156 activated by an electromagnet and via a throttling device 158. In its electrically unactuated basic position, in BBW mode the valve 156 assumes the position shown in FIG. 1 in which the master cylinder 148 is decoupled from the simulator 160 so that hydraulic fluid can be conveyed into the brake circuits I. and II.

The simulator 160 is provided in order to communicate the familiar pedal feedback behavior to the driver when the master cylinder 148 is hydraulically decoupled from the brake circuits I. and II. In order to be able to receive hydraulic fluid from the master cylinder 148, the simulator 160 comprises a cylinder 162 in which a piston can be displaced counter to a spring force.

In its electrically unactuated basic position according to FIG. 1, a further 2/2-way valve 166, activated by an electromagnet, between the master cylinder 148 and the reservoir 122 enables hydraulic fluid to pass from the reservoir 122 into the master cylinder 148 in PT mode. In its electrically actuated position, in contrast, the valve 166 decouples the master cylinder 148 from the reservoir 122.

In other exemplary embodiments, the functional decoupling of the brake pedal 130 and wheel brakes VL, VR, HL, HR can also be obtained by a cylinder on which the brake pedal 130 can act being connected upstream from the master cylinder 148. This cylinder is coupled to the simulator 160 via the valve 156 and the throttling device 158 in BBW mode and to the master cylinder 148 in PT mode.

The hydraulic coupling of the wheel brakes VL and VR is determined by 2/2-way valves 170, 172, 174, 176 or 170', 172', 174', 176' which are activated by electromagnets and assume the basic positions shown in FIG. 1 in the unactivated, i.e. electrically unactuated state. This means that the valves 170, 174 or 170', 174' each assume their throughflow position and the valves 172, 176 or 172', 176' each assume their blocking position. Because the two brake circuits I. and II. are designed symmetrically, a description of the components associated with the second brake circuit II. and the wheel brakes HL and HR is omitted here and below.

As shown in FIG. 1, the second functional unit 120 is arranged in the fluid path between the valves 174, 176 and the wheel brake VL (and for reasons of symmetry, the same applies to the wheel brake VR). The second functional unit 120 assumes a throughflow position in the case of full functionality of the first functional unit 110 and/or in PT mode. This means that hydraulic fluid emerging from the first functional unit 110 can pass unhindered to the wheel brakes VL, VR. In order to perform normal braking, in the basic position of the valves 170, 172, 174, 176 shown in FIG. 1, there is therefore a direct hydraulic connection between the electrical brake pressure generator 132 (or, depending on the position of the valves 152, 154, the master cylinder 148), on one hand, and the wheel brakes HL and VL of the first brake circuit I., on the other hand (and the same applies to the wheel brakes HR and VR of the second brake circuit II.).

The two valves 170 and 172 form a valve arrangement associated with the wheel brake HL, whilst the two valves 174 and 176 form a valve arrangement associated with the wheel brake VL. From the perspective of the electrical brake pressure generator 132, the second functional unit 120 is thus provided downstream from the valve arrangement 174, 176 and connected between this valve arrangement 174, 176 and the associated wheel brake VL.

As explained below, the two valve arrangements 170, 172 or 174, 176 associated with the wheel brakes HL and VL, and the brake pressure generator 132, are each designed to be actuated for wheel brake pressure regulating actions at the respective wheel brakes HL and VL. A control unit 180 (also referred to as an electronic control unit, ECU) which is provided for actuating the valve arrangements 170, 172 or 174, 176 and the brake pressure generator 132 as part of the wheel brake pressure regulating actions is also shown schematically in FIG. 1. The control unit 180 is part of the first functional unit 180 and implements, for example, the vehicle-stabilizing wheel brake pressure regulating functions of an antilock braking system (ABS), an electronic stability control (ESC) system, a traction control system (TCS), or an adaptive cruise control (ACC) system. Instead of a single control unit 180, a plurality of such control units can of course be provided which are responsible for different wheel brake pressure regulating functions (possibly in a complementary or redundant fashion).

The second functional unit 120 also comprises a control unit 180' which is provided separately from the control unit 180 for reasons of redundancy and also implements one or more (or all) of the abovementioned vehicle-stabilizing brake pressure regulating functions. In addition to or as an alternative to providing separate control units 180, 180', two redundant electrical power supplies and/or separate electrical power supplies could be provided for the two functional units 110, 120. These power supplies could take the form of batteries.

An antilock braking system (ABS) prevents the wheels from locking during braking. To do this, it is necessary to modulate the brake pressure in the wheel brakes VL, VR, HL, HR individually. This is effected by sequentially adjusting alternate phases of building up, maintaining, and reducing pressure which are the result of appropriately actuating the valve arrangements 170, 172 or 174, 176 associated with the wheel brakes HL and VL, and possibly the brake pressure generator 132.

During a phase in which pressure is built up, the valves 170, 172 or 174, 176 each assume their basic position such that an increase in the brake pressure in the wheel brakes HL and VL (as in the case of BBW braking) by means of the brake pressure generator 132 results. For a phase of maintaining pressure, all that is required is for the valve 170 or 174 to be actuated, i.e. transferred into its blocking position. Because there is no actuation of the valve 172 or 176 here, it remains in its blocking position. The wheel brake HL or VL is consequently hydraulically decoupled such that a brake pressure present in the wheel brake HL or VL is maintained constant. In a phase in which pressure is reduced, both the valve 170 or 174 and the valve 172 or 176 are actuated, i.e. the valve 170 or 174 is transferred into its blocking position and the valve 172 or 176 into its through-flow position. Hydraulic fluid can thus flow from the wheel brake HL or VL toward the reservoir 122 in order to lower a brake pressure present in the wheel brake HL or VL.

Other brake pressure regulating actions in normal braking mode take place automatically and typically independently of activation of the brake pedal 130 by the driver. Such automated regulation of the wheel brake pressure takes place, for example, in conjunction with traction control which prevents individual wheels from slipping when a vehicle pulls away by selective braking, with electronic stability control which adapts the vehicle behavior to the driver's intention and the road conditions at the limit of adhesion by selectively braking, or with adaptive cruise control which inter alia maintains a distance of the individual vehicle from a vehicle driving in front of it by automatic braking.

When performing automatic wheel brake pressure regulation, a brake pressure can be built up at at least one of the wheel brakes HL or VL by the brake pressure generator 132 being actuated by the control unit 180. The valves 170, 172 or 174, 176 associated with the wheel brakes HL or VL here initially assume their basic positions illustrated in FIG. 1. Fine adjustment or modulation of the brake pressure can be carried out by corresponding actuation of the brake pressure generator 132 and the valves 170, 172 or 174, 176 associated with the wheel brakes HL or VL, as explained above by way of example in connection with ABS.

Regulation of the wheel brake pressure is generally effected by means of the control unit 180 depending on one or more measured values describing the vehicle behavior (for example, wheel rpm, yaw speed, lateral acceleration, etc) and/or one or more measured values describing the driver's intention (for example, activating the pedal 130, steering wheel angle, etc). An intention of the driver to decelerate can be determined, for example, by means of a travel sensor 182 which is coupled to the brake pedal 130 or an input element of the master cylinder 148. Alternatively or additionally, the brake pressure generated in the master brake cylinder 148 by the driver can be used as the measured value describing the driver's intention and is then detected by means of at least one sensor. For this purpose, in FIG. 1 an individual pressure sensor 184, 184' is associated with each of the brake circuits I. and As explained above, from the perspective of the brake pressure generator 132, the second functional unit 120 is provided downstream from the valve arrangement 174, 176 and connected between this valve arrangement 174, 176 and the associated wheel brake VL. Specifically, a hydraulic fluid inlet of the second functional unit 120 is coupled between an outlet of the valve 174 and an inlet of the valve 176 (viewed in the direction of flow from the pressure generator 132 to the reservoir 122).

As shown in FIG. 1, the second functional unit 120 comprises a further electrical brake pressure generator 188. The further brake pressure generator 188 can be actuated by the control unit 180' and in the exemplary embodiment comprises an electromotor 190 and a pump 192, 192' configured, for example, as a geared pump or radial piston pump per brake circuit I. and II., respectively, (in this case, per wheel brake VL and VT, respectively). In the exemplary embodiment, each pump is shown in a position blocking flow in their delivery direction, such as with the aid of the (optional) blocking valves at the outlet and inlet of the pumps 192, 192'. The pumps 192, 192' are each configured in order to aspirate hydraulic fluid from the reservoir 122 via the first functional unit 110. Because the speed of the electromotor 192 can be adjusted, the delivery rate of the pumps 192, 192' can also be adjusted by means of corresponding actuation of the electromotor 192. In another embodiment, the two pumps 192, 192' could also be replaced by a single pump working using the plunger principle (for example, with a single- or double-acting cylinder/piston arrangement).

The second functional unit 120 is also designed symmetrically with respect to the brake circuits I. and II. In turn, only those components of the second functional unit 120 which are associated with the first brake circuit I. (in this case, of the wheel brake VL) are therefore explained in detail below. These components comprise a pressure sensor 196 which enables the pressure generator 188 (and hence the pump 192) to be actuated up to a target pressure value. The pressure is evaluated and the pressure generator 188 is actuated, as explained above, by the control unit 180'. An optional pressure sensor (not shown) provided on the inlet side of the second functional unit 120 could be provided in order to identify that the driver is applying the brake (for example, via the master cylinder 148) in the active second functional unit 120. In this way, adaptive cruise control currently being performed by the second functional unit 120 can, for example, be interrupted in favor of emergency braking of the vehicle until it comes to a halt.

If a malfunction of the first functional unit 110 is detected (for example, owing to failure of the pressure generator 132 or a leak in the region of the first functional unit 110), the second functional unit 120 can undertake the brake pressure generation and in particular the brake pressure regulation at the wheel brakes VL and VR redundantly with respect to the first functional unit 110. For example, one or more of the following (or other) brake pressure regulation functionalities can be performed autonomously by means of the second functional unit 120: braking force boosting, ABS, ESC, ASR, and ACC.

The redundancy provided by the second functional unit 120 therefore enables the use of the motor vehicle brake system 100 shown in FIG. 1 also for application in the case of semi-autonomous or autonomous driving. In particular in the latter case of application, the master cylinder 148 and its accompanying components (such as the brake pedal 130 and the simulator 160) could also be completely omitted.

The two functional units 110, 120 share a hydraulic system (namely, that of the first functional unit 110 with the reservoir 122). The second functional unit 120 is thus also operated completely with hydraulic fluid from the reservoir 122 and returns the hydraulic fluid to this reservoir 122. In the case where the second functional unit 120 is used, the pump 192 therefore aspirates fluid from the reservoir 122 directly via the corresponding inlet-side attachment to the first functional unit 110 via the latter (and the correspondingly opened valve 176).

A bypass valve 302 which takes the form of a 2/2-way valve activated by an electromagnet in the exemplary embodiment is connected in parallel to the pump 192. In the unactivated, i.e. electrically unactuated state, this valve 302 assumes the basic position shown in FIG. 1. The basic position here means that the valve 302 assumes its through-flow position. In this way, hydraulic fluid can be delivered from the first functional unit 110 to the wheel brake VL and flow back to the first functional unit 110 (and to the reservoir 122). The valve 302 is actuated by the control unit 180'.

In the electrically unactuated state, the valve 302 assumes a blocking position in such a way that hydraulic fluid delivered by the pump 192 passes to the wheel brake VL and cannot escape to the first functional unit 110. However, such an escape (in the throughflow position of the valve 302) can be desired as part of pressure regulation by the second functional unit 120 when brake pressure needs to be built up at the wheel brake VL (for example, as part of ABS control). Because the valve 302 blocks only on one side in its blocking position in the exemplary embodiment, the brake pressure at the wheel brake VL can still be increased by means of the first functional unit 110 (for example, when the master cylinder 148 is activated in PT mode).

The second functional unit 120 furthermore comprises an optional accumulator 402 which provides additional hydraulic fluid volume to be aspirated by the pump 192. The background to this storage of an additional hydraulic volume is the fact that the aspiration path of the pump 192 through the first functional unit 110 might not be able to supply a hydraulic fluid volume sufficiently quickly, especially in the case of low temperatures. Depending on the design of the functional units 110, 120, the provision of an additional hydraulic fluid volume may also be desired generally (possibly irrespective of the temperature) in order to assist the rapid build-up of pressure at the wheel brake VL.

In the present exemplary embodiment, the accumulator 402 takes the form of a pressure accumulator, specifically a spring-loaded piston accumulator. The pressure accumulator 402 could also be a diaphragm accumulator or a piston sealed with a rolling lobe air spring. The pressure accumulator 402 is arranged so that it can be flowed through between the inlet of the pump 192 and the hydraulic interface with the first functional unit 110, on one hand, and the valve 302, on the other hand. The throughflow arrangement permits simple ventilation and allows the hydraulic fluid to be replaced easily as part of a routine service.

In other exemplary embodiments, the accumulator 402 can be a fluid accumulator which takes the form of a piston accumulator and has no return spring. This piston accumulator is provided in a fluid path between the pump 192 and the valve 302, on the one hand, and the first functional unit 110 and the second valve 502, on the other hand. The piston accumulator can be provided with a lip seal which is capable of sealing the piston from atmospheric pressure. As already mentioned above, there is, however, no return spring or similar element in order to force the piston of the piston accumulator back into its accumulator position after the piston accumulator has been partially or completely emptied. The accumulator position corresponds to that position in which the piston accumulator is substantially full to the maximum with hydraulic fluid.

When hydraulic fluid is aspirated by the pump 192 from the piston accumulator, the piston of the latter moves from its accumulator position into an extraction position. In order to then force the piston from this extraction position back into its accumulator position, it is provided that hydraulic fluid which flows back from the pressurized wheel brake VL, VR toward the first functional unit 110 is capable of forcing the piston into its accumulator position. For this purpose, the valve 502 is closed and the valve 302 is open such that the back-flowing hydraulic fluid can pass into the piston accumulator. Its piston is thus displaced counter to atmospheric pressure until a line, communicating with the cylinder of the piston accumulator, to the first functional unit 110 is freed. A spring-loaded non-return valve which permits hydraulic fluid to flow back to the functional unit 110 but acts so as to block flow in the opposite direction can be provided in this line. The opening pressure for opening the non-return valve is here selected to be relatively low and is less than 1 bar (for example, 0.5 bar).

A second non-return valve which is arranged opposite the first non-return valve can be provided in a further line between the first functional unit 110 and the piston accumulator, parallel to the line between the piston accumulator and the first functional unit 110 in which the non-return valve is accommodated. This second non-return valve permits hydraulic fluid to be aspirated from the first functional unit 110 through the piston accumulator by means of the pump 192 (and acts in a blocking fashion in the opposite direction). The line with the second non-return valve is attached to the cylinder of the piston accumulator so that it is offset axially with respect to the line with the first non-return valve in such a way that in every position of its piston it is possible for hydraulic fluid to be aspirated from the first functional unit 110 through the cylinder.

The second functional unit 120 moreover comprises an optional further bypass valve 502 which is arranged parallel to the bypass valve 302 and is switched together with the latter. The valve 502 which takes the form of an electromagnetically activated 2/2-way valve in the exemplary embodiment assumes the basic position shown in FIG. 1 in the unactivated, i.e. electrically unactuated state. As with the valve 302, the basic position means that the valve 502 assumes its throughflow position. The valve 502 can be actuated by the control unit 180.

Thus, even in the event of an incorrectly closed bypass valve 302 or blocking failure of the throughflow pressure accumulator 402, hydraulic pressure can still be reduced at the wheel brake VL via the open valve 502. Moreover, the throughflow resistance from the first functional unit 110 to the wheel brake VL is reduced by the two valves 302 and 502 switched in parallel such that the so-called "time to lock" of the wheel brake VL is also reduced in the event of a required rapid build-up of pressure at the wheel brake VL. It should be understood that this is similarly the case for the wheel brake VR. In general, owing to the symmetrical design of the brake system 100, all statements about the wheel brake VL made in connection with the exemplary embodiments also apply to the wheel brake VR.

According to the exemplary embodiment in FIG. 1, only the two front wheel brakes are connected to the second functional unit 120. In other exemplary embodiments, all four wheel brakes VL, VR, HL, HR are connected to the second functional unit 120. The second functional unit 120 is then capable of performing a build-up of brake pressure (and in particular brake pressure regulation) at all these wheel brakes VL, VR, HL, HR. For this purpose, a hydraulic fluid inlet of the second functional unit 120, for example for the left rear wheel HL, can be coupled between an outlet of the valve 170 and an inlet of the valve 172 (viewed in the direction of flow from the pressure generator 132 to the reservoir 122).

Whereas the hydraulic layout of the brake system 100 is illustrated first in FIG. 1, the electronic layout of the brake system 100 and in particular the electrical actuation of some of the components incorporated in the brake system 100 will now be described in detail with reference to FIG. 2. The same reference symbols refer to the same or corresponding components. It should be pointed out that the electronic layout illustrated in FIG. 2 can also be used in brake systems which differ from the brake system 100 shown in FIG. 1.

Figure 2:
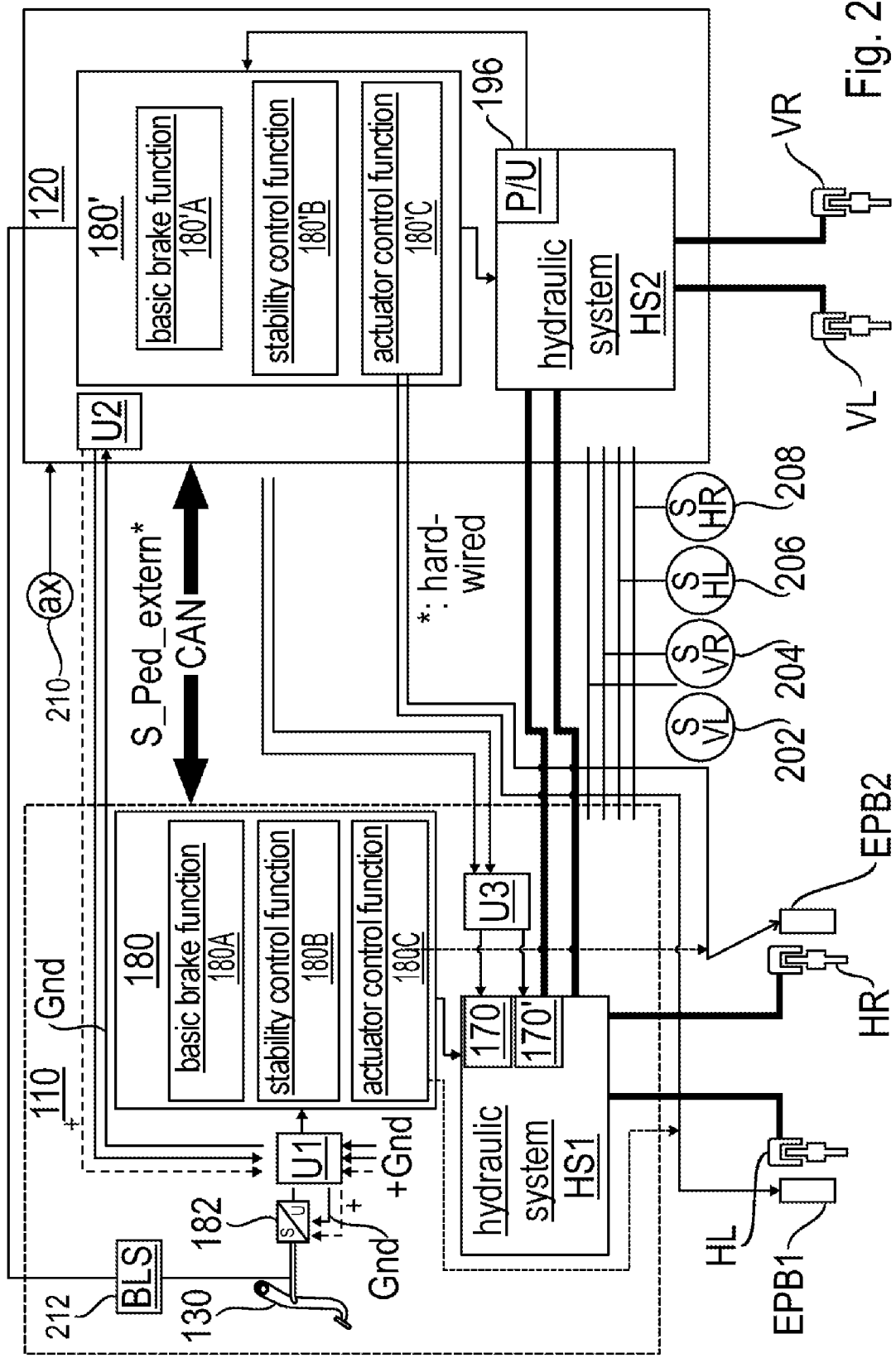
FIG. 2 shows an illustration of control aspects associated with the brake system according to FIG. 1.

First of all, the distribution of the different components of the brake system 100 over a first functional unit 110 and a second functional unit 120 is shown again in FIG. 2. The hydraulic components of the first functional unit, such as for example its valves and the brake pressure generator 132, are combined to form a first hydraulic system HS1. In the same way, the corresponding components of the second functional unit 120, such as its valves and the brake pressure generator 188, are combined to form a second hydraulic system HS2. The two valves 170, 170' of the hydraulic system HS1 and the pressure sensor 196 of the hydraulic system HS2, which will be explained in detail below, are particularly highlighted.

The relevant software functions are highlighted in each case for the control units 180, 180". The microprocessor of the control unit 180 is thus designed to implement the software functions of a basic brake system 180A, a stability control system 180B, and an actuator control system 180C. Similarly, the microprocessor of the control unit 180' is designed to implement the software functions of a basic brake system 180'A, a stability control system 180'B, and an actuator control system 180'C. The functions of the basic brake systems 180A, 180"A are designed to actuate the hydraulic system HS1 and HS2 in connection with a normal braking action. The functions of the stability control systems 180B, 180"B permit inter alia actuation of the respectively associated brake pressure generator 132 and 188 in connection with a vehicle-stabilizing brake pressure regulation (as already explained with reference to FIG. 1). Lastly, the functions of the actuator control systems 180C, 180"C permit electrical actuation of the two parking brake actuators EPB1 and EPB2. These parking brake actuators EPB1, EPB2 are shown in FIG. 2 in each case incorporated with the associated hydraulic wheel brake HL or HR to form a single wheel brake unit.

A plurality of sensors of the brake system 100 are moreover illustrated in FIG. 2. In addition to the pedal travel sensor 182 and the pressure sensor 196 which have already been explained with reference to FIG. 1, the brake system 100 moreover comprises four wheel sensors 202, 204, 206, 208. These wheel sensors 202, 204, 206, 208 are each associated with one of the four vehicle wheels and permit the corresponding wheel rpm or wheel speed to be determined. An acceleration sensor 210 detects the longitudinal acceleration ax of the vehicle and a brake light switch 212 generates in a known manner a brake light signal when the brake pedal 130 is activated.

The brake system 100 moreover comprises a plurality of switching devices U1, U2, U3. The two switching devices U1, U3 are part of the first functional unit 110 and can also be integrated in the control unit 180. The switching device U2 is part of the second functional unit 120 and can also be integrated in the control unit 180'.

Various aspects connected with the actuation of the parking brake actuators EPB1, EPB2 by the control unit 180' are explained below. As already mentioned above, the second control unit 180' is capable of actuating selectively or together the brake pressure generator 188 (by means of the basic brake function 180'A or the stability control function 180'B) and one or both of the parking brake actuators EPB1, EPB2 (by means of the actuator control system function 180"C). In general, one or both of the parking brake actuators EPB1, EPB2 is or are actuated by the control unit 180" in a back-up system, i.e. in the event of a malfunction of the first functional unit 110 (for example, in the event of failure of the control unit 180). One or both of the parking brake actuators EPB1, EPB2 can be actuated inter alia in order to initiate, increase, or decrease deceleration of the vehicle or in order to increase or decrease the wheel speed of individual wheels. The characteristic feature of this is that, when one or both of the parking brake actuators EPB1, EPB2 is or are actuated by the control unit 180', the vehicle is in motion (for example, at a speed of more than 10 km/h). In addition, in many implementations the control unit 180' can actuate the two parking brake actuators EPB1, EPB2 even when the vehicle is at a halt. This enables a conventional parking brake action in order to park the vehicle even in the event of a malfunction of the first functional unit 110.

Various scenarios are described below of how one or both of the parking brake actuators EPB1, EPB2 are actuated, together with or independently of the brake pressure generator 188, by the control unit 180' in the event of a malfunction of the first functional unit 110.

The first actuation scenario concerns ABS control at one or both wheels of the front axle and at one or both wheels of the rear axle. In order to perform the ABS control as a back-up system at a front wheel, the brake pressure generator 188 (and/or further components of the hydraulic system HS2) is actuated by means of the stability control function 180'B. In this way, the respective wheel slip can be controlled at the wheel brake VL of the left front wheel and/or the wheel brake VT of the right front wheel. This slip regulation by the stability control function 180"B is based on the front wheel speeds as provided by the two wheel sensors 202, 204.

Because the brake pressure generator 188 according to the hydraulic layout illustrated in FIG. 1 is not capable of building up a brake pressure at the rear wheel brakes HL, HR, the slip regulation takes place at the two rear wheels by means of actuation of one of both of the parking brake actuators EPB1, EPB2 by the control unit 180". The slip regulation is performed by the stability control function 180"B on the basis of the rear wheel speeds as received from the wheel sensors 206, 208. Based on evaluation of the rear wheel speeds, the stability control function 180"B then generates actuation signals for the actuator control system 180"C which in turn is capable of actuating the parking brake actuators EPB1, EPB2 individually or together. It should be pointed out that such slip regulation still remains possible at the rear wheels even in the event of failure of the hydraulic system HS2.

A second actuation scenario for vehicle-stabilizing braking force regulation is oversteer regulation in connection with ESC intervention. When the tendency of the vehicle to oversteer begins, the front wheel pointing in the direction of deviation of the vehicle is here actively braked. In the event of a malfunction of the first functional unit 110, this braking can be assumed by the second functional unit 120. For this purpose, the stability control function 180"B of the control unit 180' actuates the hydraulic system HS2 and in particular the brake pressure generator 188 (cf FIG. 1) in a suitable fashion in order to build up a brake pressure at the front wheel brake VL, VR in question. The sensor signals evaluated in this connection by the stability control function 180"B concern, for example, the yaw rate of the vehicle, the lateral acceleration of the vehicle, and/or the steering angle. If electrical parking brake actuators are also integrated at the front wheels, the stability control function 180"B can also actuate the actuator control system 180'C via the latter in order to obtain oversteer regulation by braking the corresponding front wheel.

A third actuation scenario for vehicle-stabilizing braking force regulation in the event of a malfunction of the first functional unit 110 is understeer regulation. When the vehicle begins to understeer, in addition to other measures, typically the inside rear wheel is actively braked. Because the second functional unit 120 cannot build up brake pressure at the rear axle by means of the brake pressure generator 188 (cf FIG. 1), the parking brake actuator EPB1, EPB2 of the inside rear wheel is activated for understeer regulation by the stability control function 180"B and the actuator control system 180"C. As already explained above in connection with the oversteer regulation, for this purpose the stability control function 180'B processes sensor signals concerning the yaw rate, the lateral acceleration, and/or the steering angle of the vehicle.

A fourth actuation scenario in the event of a malfunction of the first functional unit 110 relates to common brake force boosting by the brake pressure generator 188 and by the parking brake actuators EPB1, EPB2 for the case where a driver is directly responsible for the build-up of brake pressure at the wheel brakes in PT mode or otherwise (for example, in the case of a different configuration of the brake system 100). This also includes the case where a driver intervenes in an ongoing braking action initiated by the second functional unit 120.

In order to assist the driver, in the fourth actuation scenario the brake pressure at the front wheels is boosted by means of the brake pressure generator 188 in proportion to the driver's intention. In this connection, the slipping of the front wheels can furthermore also be regulated conditionally, in particular by an appropriate actuation of the brake pressure generator 188 in such a way that the boosted brake pressure is always below the slip limit (i.e. by decreasing a boosting factor). Such a conditional slip regulation is, however, only possible as long as the unboosted pressure from the driver is still below the locking limit.

Similarly, the driver's intended braking force can also be boosted at the rear axle by means of the parking brake actuators EPB1, EPB2. For this purpose, a proportion of braking force which is proportional to the brake pressure requested by the driver is generated by the controlled closing of the parking brake actuators EPB1, EPB2 by the basic brake function 180"A and the actuator control system 180"C.

Figure 3:
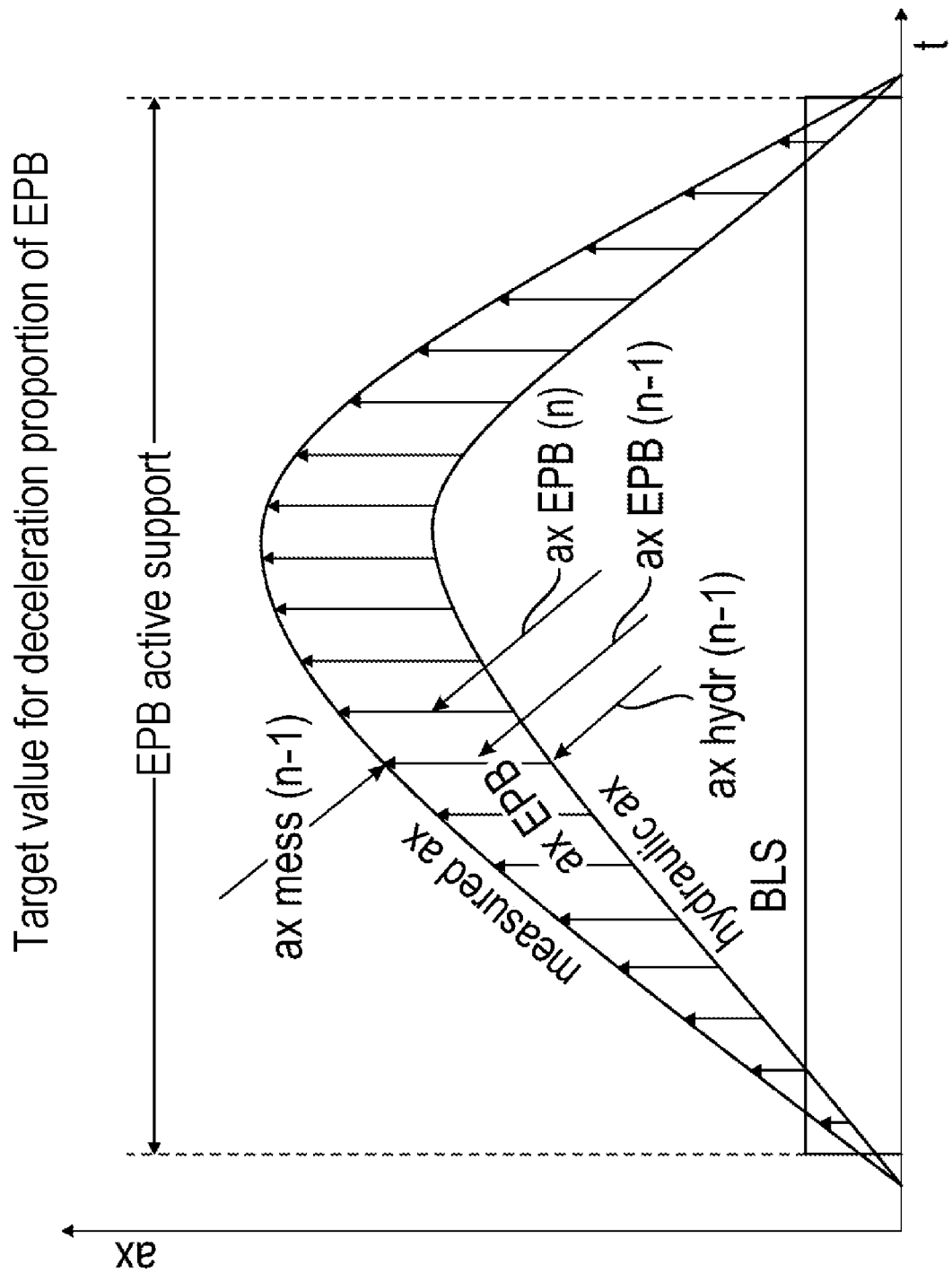
FIG. 3 shows a schematic view of EPB-assisted braking.

FIG. 3 illustrates in a schematic diagram how the boosting of the hydraulic pressure generated by the driver can be performed by means of the parking brake actuators EPB1, EPB2 in the event of a malfunction of the first functional unit 110. The parking brake actuators EPB1, EPB2 are activated by the basic brake function 180"A when a deceleration of the vehicle requested by the driver at the brake pedal 130 is detected (for example, in PT mode or in a different operating mode). For this purpose, the signal of the pedal travel sensor 182 or the brake light switch 212 can be evaluated.

In the example shown in FIG. 3, the focus is on the signal of the brake light switch 212. The target value of the electromechanical assistance is here calculated on the basis of the measured longitudinal acceleration of the vehicle ax_mess. For this purpose, the basic brake function 180"A evaluates the corresponding signal of the acceleration sensor 210. The required proportion of deceleration ax_soll_EPB (n) attributable to the parking brake actuators EPB1, EPB2 at time n is thus calculated on the basis of an iterative algorithm. Specifically, the following algorithm can, for example, be used in this connection:

$$ax\_hydr(n-1)=[ax\_mess(n-1)-ax\_EPB(n-1)]$$

$$ax\_soll\_EPB(n)=ax\_hydr(n-1)*EPB\_Gain,$$

where ax_hydr(n−1) is a hydraulic proportion of deceleration calculated for example on the basis of a pressure signal of the sensor 196, ax_mess(n−1) is deceleration of the vehicle pertaining at time n−1, and EPB_Gain is a boosting factor. This iterative algorithm is illustrated in FIG. 3. It can be clearly seen that the measured total deceleration ax_mess is composed in each case of a hydraulic proportion of deceleration and a proportion of deceleration attributable to the activation of the parking brake actuators EPB1, EPB2. In order to take into account any downhill momentum which may be present and can falsify the measurement of the acceleration sensor 201, it is possible to compensate a slope value present in the output signal of the acceleration sensor 210. This slope value can be compensated, for example, using a measured angle of inclination.

The actuation of the parking brake actuators EPB1, EPB2 illustrated in FIG. 3 can take place according to slip regulation. In this connection, the boosting factor EPB_Gain can, for example, be reduced depending on the situation in such a way that the locking limit of a relevant wheel is not exceeded. However, such a procedure is successful only as long as the unboosted driver pressure at the rear wheel brakes HL, HR is below the locking limit. However, if the unboosted driver pressure reaches or exceeds the locking limit, another measure for slip regulation must be adopted. Specifically, in the present exemplary embodiment according to FIGS. 1 and 2, in this case in order to increase stability, actuation of the rear axle isolating valves 170, 170' by the second functional unit 120 is provided so as to limit the rear axle brake pressure generated by the driver for slip regulation. Owing to the malfunction of the first functional unit 110, the valves 170, 170" can namely generally no longer be closed by the control unit 180.

In order to enable the valves 170, 170" to be closed by the control unit 180' in the event of failure of the control unit 180, the switching device U3 is provided (cf. FIG. 2). The switching device U3 takes the form of a transistor-based switchover device and, depending on the functionality of the first functional unit 110, selectively couples the control unit 180 of the first functional unit 110 or the control unit 180' of the second functional unit to the two valves 170, 170" in order to enable these valves 170, 170" to be actuated by the corresponding control unit 180 or 180", respectively. For this purpose, separate actuation lines between the control unit 180' and the switching device U3 can be provided. The switchover of the switching device U3 between the control unit 180 and the control unit 180' can be initiated by the control unit 180" or another component (for example, the control unit 180) which is capable of detecting a malfunction of the first functional unit 110.

One or both of the valves 170, 170" is actuated in the event of a malfunction of the first functional unit 110 by the stability control function 180"B and depending on the speed of the associated rear wheel which was detected by the corresponding sensor 206, 208. The stability control function 180"B can in this connection use a conventional ABS control algorithm in order to prevent the locking of the corresponding rear wheel.

In the abovedescribed exemplary embodiment, a brake pressure generated by the driver is limited by closing one or both of the valves 170, 170" by the control unit 180". Of course, incorrect brake pressure which is generated by the brake pressure generator 132, for example in an accident, could in the same way also be limited.

In addition to the switching device U3, two further switching devices U1, U2 are integrated into the brake system 102. These further switching devices U1, U2 allow the brake pedal travel sensor 182 to be coupled, depending on the functionality of the first functional unit 110, selectively to the control unit 180 of the first functional unit 110 or to the control unit 180' of the second functional unit 120.

The switching functions explained below with reference to the switching device U1 and the (optional) switching device U2 are not restricted to the brake pedal travel sensor 182. These switching functions could instead additionally or alternatively also be provided for one or more of the further sensors such as, for example, the wheel sensors 202, 204, 206, 208, the acceleration sensor 210, or the brake light switch 212. The switching function proposed here has the advantage that one sensor can be provided for both functional units 110, 120. The sensor per se therefore does not need to be implemented redundantly.

The switching device U1 consequently allows the pedal travel sensor 182 (and/or another sensor) to be coupled to the second control unit 180' in the event of a malfunction of the first functional unit 110. The output signal S_Ped_extern of the sensor 182 is then fed via a separate line from the switching device U1 to the control unit 180' of the second functional unit 120. To be more precise, the signal of the switching device U2 is transmitted to the functional unit 120. This switching device U2 (or another component of the second functional unit 120) is designed to couple an output of the switching device U1 (and hence the corresponding sensor signal) to the second control unit 180' depending on the functionality of the first functional unit 110. In other words, the switching device U1 is actuated, in particular switched over, by the second functional unit 120.

The switching device U2 is therefore designed to couple the signal of the pedal travel sensor 182 to the actual processing electronics (for example, a microprocessor) depending on the first functional unit 110. The switching device U2 can be integrated into an electronic module of the second control unit 180'. In the same way, the switching device U1 can be integrated into an electronic module of the control unit 180.

The switching device U1 or another switching device is moreover designed to couple the sensor 182 (and/or another sensor) selectively to a first power supply or a second power supply which is provided in addition to the first power supply. The first power supply is here associated with the first functional unit 110 and the second power supply with the second functional unit 120. The corresponding switchover of the power supply can in turn be effected by the switching device U2. For this purpose, two power supply lines run from the switching device U2 to the switching device U1.

Because the switching device U1 and the switching device U2 are provided, the signal of the pedal travel sensor 182 (and/or another sensor) is available for the back-up system in the second functional unit 120 even in the event of failure of the power supply of the first functional unit 110 or in the event of failure of the control unit 180. If the switching device U1 itself is no longer functioning properly, for example owing to the ingress of water or mechanical damage to an electronic module, the pedal travel signal must be dispensed with. However, the second functional unit 120 can as an alternative resort to another sensor, for example the pressure sensor 196, in order to detect the corresponding braking intention of the driver. In the event of another partial failure of the first functional unit 110, for example of the hydraulic system HS1, if the control unit 180 continues to function the sensor signal can also be transmitted from the first functional unit 110 to the second functional unit 120 via a vehicle bus, for example the CAN bus marked in FIG. 2.

In general, the redundancy afforded by the second functional unit 120 provides a technical safety improvement which makes the brake system 100 presented here suitable, for example, also for application in autonomous or semi-autonomous driving (for example, in RCP mode). In particular, in the event of failure of the first functional unit 110 and the absence of any intervention by the driver at the (optional) brake pedal 130, the vehicle can still be brought to a halt safely by means of the second functional unit 120 (and possibly the parking brake actuators EPB1, EPB2), i.e. including vehicle-stabilizing brake pressure regulation which may be required.

For example in the event of failure of a separate energy supply for the first functional unit 110 (in particular for the electrical pressure generator 132), defective functionality of the first functional unit 110 can also be detected. If, in this state, the requirement for brake pressure regulation at one of the wheel brakes VL and VR is detected (for example, the need for ESC intervention), it is effected by means of the second functional unit 120 for which a separate energy supply is provided (and possibly using the parking brake actuators EPB1, EPB2).

In a further example, the failure of the first functional unit 110 (for example, a mechanical failure of the transmission 142 of the pressure generator 132) can cause the vehicle to be braked to a halt immediately and automatically. If ABS control is required during this braking action, it is undertaken by the second functional unit 120 (and possibly the parking brake actuators EPB1, EPB2).

The invention claimed is:

1. A hydraulic motor vehicle brake system comprising:
   a first sensor device which is designed to generate a sensor signal;
   a first functional unit with
   at least one first electrical brake pressure generator by means of which a brake pressure can be generated in each case at wheel brakes; and
   a first control system which is designed to actuate the at least one first electrical brake pressure generator based on the sensor signal;
   a second functional unit with
   at least one second electrical brake pressure generator by means of which in each case a brake pressure can be generated at a subset of the wheel brakes; and
   a second control system which is designed to actuate the at least one second electrical brake pressure generator based on the sensor signal in the event of a malfunction of the first functional unit;
   a first switching device integrated into the first functional unit which is designed to selectively couple the first sensor device to the first control system or the second control system depending on a functionality of the first functional unit; and
   a second switching device integrated into the second functional unit which is designed to couple the first switching device to the second control system depending on a functionality of the first functional unit.

2. The brake system as claimed in claim 1, wherein the switching device is designed to couple the first sensor device to the second control system in the event of a malfunction of the first functional unit.

3. The brake system as claimed in claim 1, wherein the first functional unit comprises a first electronic module into which the first control system and the first switching device are integrated.

4. The brake system as claimed in claim 1, wherein the second switching device is designed to decouple the first switching device from the second control system in the case of a given functionality of the first functional unit.

5. The brake system as claimed in claim 1, wherein the second functional unit comprises a second electronic module into which the second control system and the second switching device are integrated.

6. The brake system as claimed in claim 1, wherein the first switching device and/or a third switching device are/is designed to couple the first sensor device selectively to a first power supply or a second power supply.

7. The brake system as claimed in claim 6, wherein the third switching device is integrated into the second electronic module.

8. The brake system as claimed in claim 1, wherein a hard-wired line is provided which couples the first switching device to the second functional unit.

9. The brake system as claimed in claim 1, wherein the first sensor device is designed to detect a parameter associated with an activation of a brake pedal.

10. The brake system as claimed in claim 1, wherein the first sensor device comprises at least one brake pedal travel sensor.

11. The brake system as claimed in claim 1, wherein the first sensor device comprises at least one wheel sensor.

12. The brake system as claimed in claim 1, wherein the first control system is designed to actuate the first electrical brake pressure generator based on the sensor signal in order to boost a hydraulic pressure generated by a driver in a master cylinder by means of a brake pedal; and/or the second control system is designed to actuate the second electrical brake pressure generator based on the sensor signal in order to boost a hydraulic pressure generated by a driver in a master cylinder by means of a brake pedal.

13. The brake system as claimed in claim 1, wherein the first control system is designed to actuate the first electrical brake pressure generator, based on the sensor signal, for a vehicle-stabilizing brake pressure regulation; and/or the second control system is designed to actuate the second electrical brake pressure generator, based on the sensor signal, for a vehicle-stabilizing brake pressure regulation.

14. The brake system as claimed in claim 1, wherein the brake system is designed to use a sensor signal of a second sensor device for actuating the first electrical brake pressure generator or the second electrical brake pressure generator instead of the sensor signal of the first sensor device in the event of a malfunction of the first switching device.

* * * * *